(12) United States Patent
Kienholz et al.

(10) Patent No.: US 9,175,467 B2
(45) Date of Patent: Nov. 3, 2015

(54) STRUCTURAL DAMPING SYSTEM AND METHOD

(75) Inventors: David A. Kienholz, San Jose, CA (US);
Bernard R. Jahn, San Martin, CA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 14/001,940

(22) PCT Filed: Mar. 4, 2011

(86) PCT No.: PCT/US2011/027248
§ 371 (c)(1),
(2), (4) Date: Aug. 28, 2013

(87) PCT Pub. No.: WO2012/121694
PCT Pub. Date: Sep. 13, 2012

(65) Prior Publication Data
US 2013/0326969 A1    Dec. 12, 2013

(51) Int. Cl.
*E04B 1/98* (2006.01)
*F16F 7/10* (2006.01)
*E04H 9/02* (2006.01)

(52) U.S. Cl.
CPC *E04B 1/985* (2013.01); *E04H 9/02* (2013.01); *F16F 7/1011* (2013.01)

(58) Field of Classification Search
CPC .......... E04B 1/985; E04H 9/02; F16F 7/1011; F16F 15/18; F16F 15/00; F16F 15/005; F16F 15/03

USPC ............ 52/167.1, 167.2, 167.4, 167.6, 741.3; 384/3, 8, 133, 103, 105, 535; 310/90, 310/90.5
See application file for complete search history.

(56) References Cited

U.S. PATENT DOCUMENTS

| | | | | | |
|---|---|---|---|---|---|
| 4,200,003 | A | * | 4/1980 | Miller | 464/180 |
| 4,363,525 | A | * | 12/1982 | Poubeau | 310/90 |
| 4,700,094 | A | * | 10/1987 | Downer et al. | 310/90.5 |
| 6,095,295 | A | * | 8/2000 | Park et al. | 188/267.2 |
| 6,672,837 | B1 | * | 1/2004 | Veldkamp et al. | 416/144 |
| 8,336,687 | B2 | * | 12/2012 | Kawabata et al. | 188/379 |
| 2012/0063915 | A1 | * | 3/2012 | Kawabata et al. | 416/244 R |

FOREIGN PATENT DOCUMENTS

| | | | | | |
|---|---|---|---|---|---|
| DE | 102007028728 | A1 | * | 12/2008 | G01M 1/36 |
| GB | 2103023 | A | * | 2/1983 | |
| JP | 01320347 | A | * | 12/1989 | |

\* cited by examiner

*Primary Examiner* — Robert Canfield
*Assistant Examiner* — Babajide Demuren
(74) *Attorney, Agent, or Firm* — Phillips Lytle LLP (57) ABSTRACT

A tuned mass damper may be formed using one or more rotary magnetic dampers (108) coupled to a pendulous mass (102). The tuned mass damper thus formed may be used to suppress the motion of a man-made structure. The mass (308) of the tuned mass damper may be adjusted by adjusting the magnitude of the pendulous mass. The natural frequency of the tuned mass damper may be tuned by adjusting the distance from the mass center of the pendulous mass to the pivot point of the pendulum. The motion being suppressed may be generated by environmental factors such as waves, earthquakes, or wind, for example.

18 Claims, 8 Drawing Sheets

STRUCTURAL DAMPING SYSTEM AND METHOD

TECHNICAL FIELD

Disclosed subject matter is related to damping unwanted motion, particularly in man-made structures such as tall buildings, bridges, and towers.

BACKGROUND ART

Wind and other environmental factors, such as water-wave action and earthquakes, have prompted builders to construct man-made structures in such a way as to reduce the unnerving and potentially dangerous swaying of such structures. One approach to the reduction of environmentally-induced structural movement is the use of a tuned mass damper (TMD). A TMD dissipates vibrational energy into heat and prevents resonant vibration from reaching dangerous levels. Tuned mass dampers typically include a moving mass, a spring mechanism, and a dashpot mechanism. The spring and mass produce a natural frequency that is, by design, slightly less than the natural frequency of the vibration mode to be damped. The TMD interacts with the target mode of the base structure in such a way as to attract vibrational energy to itself where the energy is dissipated into heat by the dashpot element of the TMD. The dashpot, often called the "damper", is a device that produces a force through it proportional to relative velocity across it. In a TMD for a building or other civil structure, the mass is typically a large concrete or steel body connected to the base structure through the spring and dashpot.

The Citicorp Building in New York City, built in 1977, was one of the first skyscrapers to use a tuned mass damper to reduce motion. The Taipei 101 Tower in Taipei, Taiwan employs a 730-ton, eighteen-foot diameter, steel sphere suspended as a pendulum and connected to the building through the pendulum fixture at the upper end of the TMD and massive hydraulic dampers at the lower end of the TMD. Its function is to reduce the building's response to environmental forces, including winds and earthquakes. This TMD reduces building sway by thirty to forty percent.

Although existing TMD systems provide some relief from structural sway, they typically employ hydraulic dampers, similar, to but larger than, automotive shock absorbers, as their dashpot elements. Hydraulic dampers use viscous oils that are under pressure and prone to leakage over the long service life required of civil structures. Organic, elastomeric, or liquid materials employed by such dampers may degrade over time. Viscosity of the oils used in hydraulic dampers is always sensitive to temperature. The resulting changes in viscosity make it difficult for the damper to operate in an optimal way over a typical range of outdoor temperatures.

Hydraulic cylinders, such as those employed by Taipei 101, must be quite long to accommodate the motion of the TMD mass, resulting in a large "footprint" for the TMD that may be difficult to accommodate within the base structure. Linear (translational) hydraulic dashpots require their own interface to the base structure in addition to the interface supporting the weight of the moving mass. This complicates the integration of the TMD into the base structure. Additionally, regular maintenance is required for the seals and fluids of a TMD using hydraulic dashpots.

TMDs for buildings are often in the form of a pendulum, with gravity combined with the pendulum length providing the spring mechanism. If the TMD mass is supported by wire ropes, these and their end fittings are subject to fatigue and may have limited life. Other approaches may include complex active components, which may add to the expense, increase the maintenance burden and reduce reliability.

BRIEF SUMMARY OF THE INVENTION

In an illustrative apparatus and method in accordance with the principles of claimed subject matter, a rotary magnetic damper may be coupled to a mass suspended as a pendulum (also referred to herein as a "pendulous mass") to suppress the motion of the base structure from which the mass is suspended.

In an illustrative embodiment, the natural swinging frequency of the pendulous mass may be tuned by adjusting the distance from the mass center to its pivot point and additionally by adjusting the moment of inertia of the swinging mass about its mass center. The pendulous mass may be free to swing in a single vertical plane normal to a single horizontal pivot axis passing through the mass' point of suspension, or in a plurality of vertical planes each passing through the mass' point of suspension, for example. A plurality of rotary magnetic dampers may be coupled to the pendulous mass in order to suppress motion in a plurality of directions.

In illustrative embodiments a mass may be supported by a rigid assembly which is configured for coupling to a man-made structure through a joint that allows the assembly to move in at least one plane. In an illustrative embodiment the assembly may include a cage and the joint may be a universal joint that allows a cage-supported mass to swing freely about any horizontal axis passing through the center point of the universal joint. In such an embodiment, the mass may be modular and made up, for example, of a plurality of steel plates or weights of other shapes that may be added to or subtracted from the mass to adjust the damper to a preferred mass. In accordance with the principles of claimed subject matter, the cage may include an adjustment mechanism for tuning the natural frequency of the tuned mass damper. In an embodiment in which a modular mass is supported by a rigid cage the mass may be moved different distances from the bottom of the cage in order to adjust the frequency of the tuned mass damper, for example. The distribution of the mass within the cage may also be adjusted to further tune the natural frequency of the device by varying the moment of inertia of the mass about axes in various directions passing through the mass center.

In illustrative embodiments one or more rotary magnetic dampers may be coupled to a mass-containing rigid cage in such a way as to rotate the rotors of the rotary magnetic dampers in response to rotation of the cage relative to a structure supporting the cage. The rotational speed and thus the damping caused by such a rotary magnetic damper may be modified, for example, through a motion amplifier, such as a belt-drive or gear system that causes the rotating element of the damper to rotate at a faster or slower speed than does the pendulous mass.

In an illustrative embodiment a novel type of universal joint suspends a rigid structure, such as a cage, containing a modular mass, such as a stack of steel plates, and a system of rotary magnetic dampers that act in response to rotation of the cage. In such an illustrative embodiment, a universal joint may be used to allow the pendulous mass to move out of phase with and at greater amplitude than the base structure as the base structure sways in response to environmental factors, such as wind, water waves, or earthquake. In such an embodiment the universal joint may include a first hinge having one side rigidly coupled to the base structure and the other side rigidly connected to an intermediate element. The embodiment may have a second hinge with an axis oriented at ninety degrees to the axis of the first hinge and with one side of the second hinge rigidly coupled to the intermediate element and the other side to the pendulous mass. The intermediate element of such a universal joint may also include cross shafts as parts of the first and second hinges, with the cross shafts including four shaft ends. In an illustrative embodiment, four rotary magnetic dampers, each including a rotor and a stator, may be coupled to the cross shafts of the universal joint, with the rotor of each of the rotary magnetic dampers coupled to a different one of the four shaft ends to move in cooperation with the shaft ends. Additionally, the stators of two of the rotary magnetic dampers may be rigidly coupled to the base structure to thereby rotate the corresponding rotary magnetic damper rotors in response to relative rotational movement between the structure and the intermediate element around the first axis. The stators of the other two rotary magnetic dampers may be rigidly coupled to the intermediate element to thereby rotate the corresponding rotary magnetic damper rotors in response to relative rotational movement between the intermediate element and the pendulous mass around the second axis.

In an illustrative embodiment, shafts of the universal joint may be coupled to rotary magnetic mass dampers through movement amplification elements, such as gearboxes, chain, or belt drives, for example. Such elements cause the rotors of the rotary magnetic dampers to execute rotations greater than the relative rotations between the base structure from which the pendulous mass is suspended and the pendulous mass itself. In an illustrative embodiment a modular mass within a steel cage includes steel plates or weights of other shapes and the total mass contained within the cage may be adjusted by adding or subtracting steel plates from the cage to cause the tuned mass damper to have the desired mass. The effective length of the pendulum, i.e. the distance from the center of mass of the moving mass to the intersection of the pivot axes of the u-joint, may be adjusted in order to tune the natural frequency of the pendulum formed by the suspended cage/mass system. The distribution of mass within the cage may also be adjusted to vary the moment of inertia of the moving mass about its mass center thereby achieving a secondary means of tuning the pendulum natural frequency.

A man-made structure in accordance with the principles of claimed subject matter may include a tuned mass damper that includes one or more rotary magnetic dampers coupled to a pendulous mass to suppress motion of the base structure to which the tuned mass damper is attached. Such a base structure may be a solar collection tower, a wind collection tower, an oil drilling or pumping platform, a bridge support tower, or a commercial, industrial, residential, or mixed-use building, for example.

A tuned mass damper in accordance with the principles of the present invention may eliminate contained fluids that may leak or seals which may fail, as do hydraulic dampers, and may be composed primarily of metal, thereby eliminating organic, elastomeric, or liquid materials that may degrade with time. And, because the relationship between speed and force is highly linear in properly designed rotary magnetic dampers, a tuned mass damper in accordance with the principles of claimed subject matter may be more effective at high velocities, when damping is most needed and when hydraulic dampers are less effective because of their nonlinear characteristics. Additionally, a tuned mass damper in accordance with the principles of claimed subject matter may be relatively stable with time and may require no external power or intelligent control. Additionally, a magnetic damping element in accordance with the principles of claimed subject matter may have a velocity-to-force or rotational-velocity-to-torque ratio that varies less with temperature than does a hydraulic damper.

BRIEF DESCRIPTION OF THE DRAWINGS

Non-limiting and non-exhaustive embodiments will be described with reference to the following figures, wherein like reference numerals refer to like parts throughout the various figures unless otherwise specified.

DETAILED DESCRIPTION OF THE PREFERRED EMBODIMENTS

Although claimed subject matter will be described in terms of certain embodiments, other embodiments, including embodiments that do not provide all of the benefits and features set forth herein, are also within the scope of this invention. Various structural, logical, and process step changes may be made without departing from the spirit or scope of the invention. Flow charts may include steps that may be deleted or otherwise modified and the sequence set forth within a particular flow chart may be modified while keeping within the scope of the invention. References to compass directions are meant for illustrative purposes only and not to limit the orientation of illustrative embodiments or elements of illustrative embodiments in accordance with the principles of claimed subject matter. Accordingly, the scope of the invention is defined only by reference to the appended claims.

Figure 1:
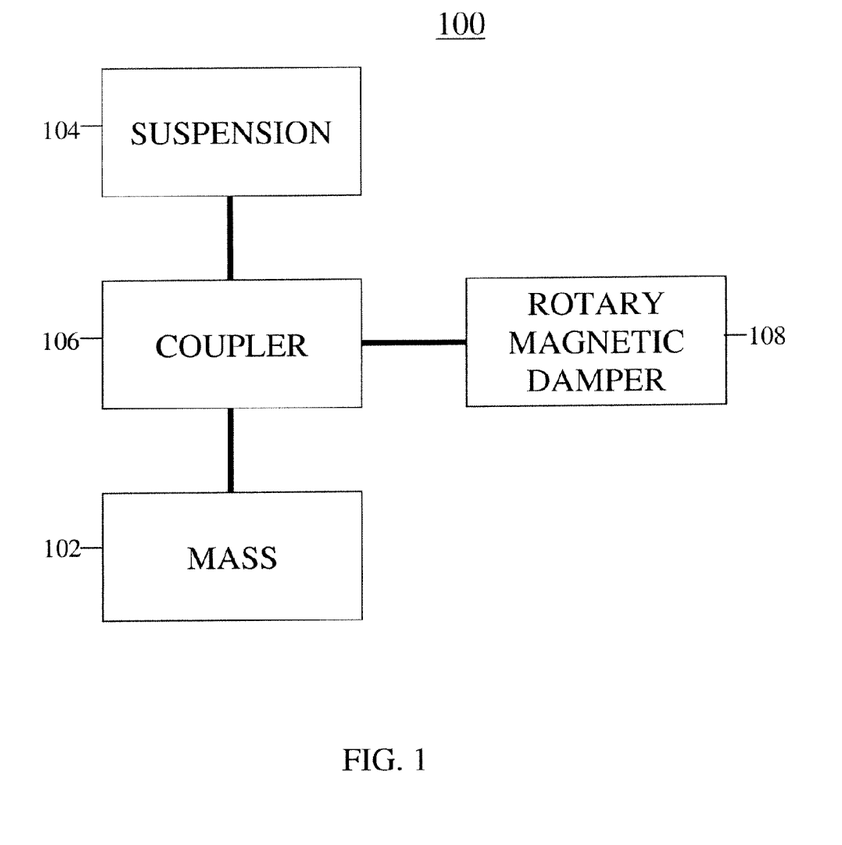
FIG. 1 is a block diagram of an embodiment of a tuned mass damper in accordance with the principles of claimed subject matter.

The block diagram of FIG. 1 illustrates the elements of an embodiment of a tuned mass damper 100 in accordance with the principles of claimed subject matter. In this illustrative embodiment a pendulous mass 102 is coupled to attachment element 104 through a coupling 106 that allows the pendulous mass 102 to swing freely in at least one plane. A rotary magnetic damper 108 is connected to the coupler 106 in a way that resists relative motion between the attachment element 104 and the pendulous mass 102. Illustrative embodiments of a pendulous mass 102, attachment element 104, coupling 106, and rotary magnetic damper 108 are described in greater detail in the discussion related to the following figures.

In an illustrative embodiment, the attachment element 104 may be rigidly attached to a man-made structure, such as a solar collector tower. In such an application, the attachment element 104 may provide a platform from which the coupling element 106 and rotary magnetic damper 108 are suspended. While rigidly attached to a man-made structure, the attachment element 104 moves in concert with the structure to which it is attached. Should the structure sway, in response to environmental factors such as high winds, waves, or earthquake, for example, the attachment element 104 will sway along with the structure, in phase with the structure's movement. The coupling element 106 permits the pendulous mass 102 to hang from the structure and swing freely relative to the attachment element 104 in one or more planes. When the base structure moves with periodic motion at its own natural frequency due to external forces, the mass element of the tuned mass damper can move relative to the attachment element. Because the tuned mass damper has a natural frequency of its own that is adjusted to a particular value slightly less than the natural frequency of the base structure, the tuned mass damper will interact dynamically with the base structure such that the mass of the TMD 100 will move with greater amplitude that does the connection element 104 and the base structure. This causes large relative motion between the base structure and the TMD mass element 102. The coupler element 106 includes motion amplifying elements such as gears to produce large rotations of the rotor of the magnetic damping element 108 relative to the stator. The magnetic elements of the rotary dampers produce a drag torque proportional to and opposing the relative angular velocity between rotor and stator, thus dissipating the energy of vibration of the combined system into heat. The action of the dampers opposes and reduces the swaying motion of the base structure. With the frequency of the tuned mass damper tuned correctly relative to the natural frequency of the structure, extreme excursions of the base structure from its resting position are curtailed.

Figure 2:
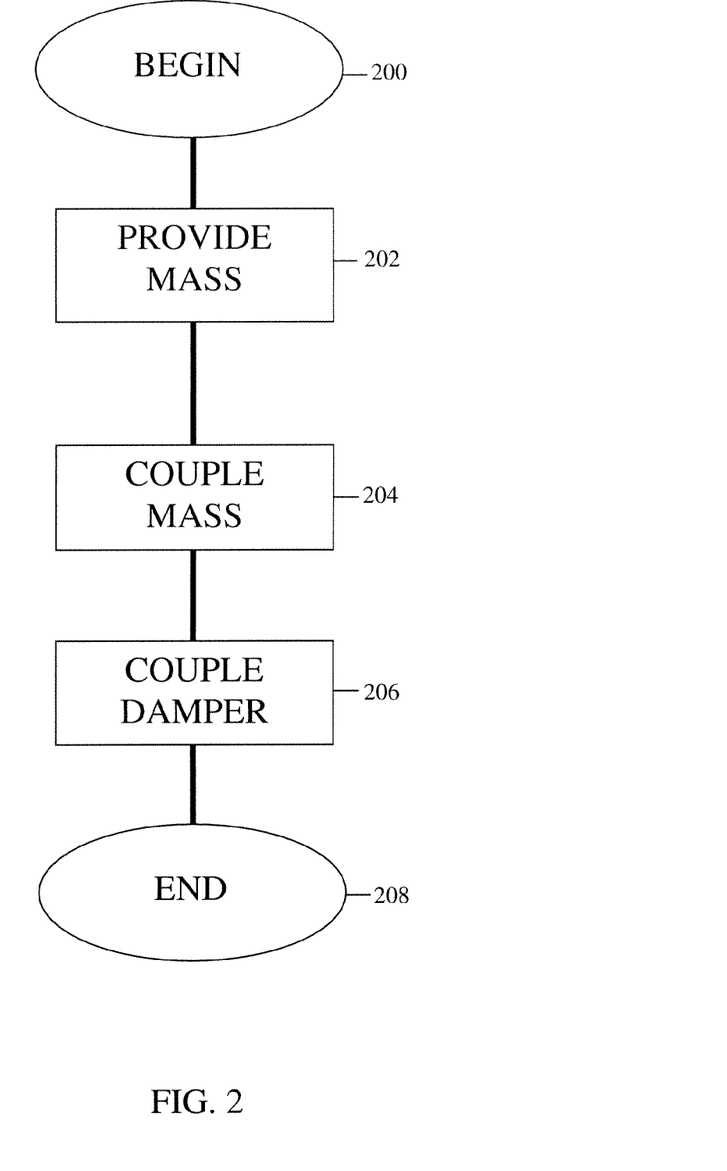
FIG. 2 is a flow chart of an embodiment of a damping process in accordance with the principles of claimed subject matter.

The flow chart of FIG. 2 illustrates an embodiment of a structure-motion damping process in accordance with the principles of claimed subject matter. Individual steps and related structures will be described in greater detail in the discussions related to other figures below. The process begins in step 200 and proceeds from there to step 202 where a pendulous mass is provided for the structure. In step 204 the pendulous mass is coupled to the structure in a manner that allows the pendulous mass to move freely in at least one plane. The action of gravity provides an effective stiffness (i.e., the "spring" element") that tends to keep the pendulous mass centered within its range of motion. In an illustrative embodiment, the pendulous mass is coupled to the structure in a manner that allows the mass to swing freely in any vertical plane. That is, in such an embodiment the mass' movement may define a limited arc in any direction of the compass. From step 204 the process proceeds to step 206 where a rotary magnetic damper is coupled to the pendulous mass in a manner that allows the rotary magnetic damper to dissipate energy as heat and thereby dampen the motion of the structure. In an illustrative embodiment four rotary magnetic dampers are coupled to a pendulous mass, allowing the dampers to dampen motion of the structure that may occur in any compass direction. From step 206 the process proceeds to end in step 208.

In an illustrative embodiment, the pendulous mass may include a modular mass carried by a rigid cage and the magnitude of the mass may be adjusted by adding or subtracting mass modules. Such mass modules may take the form of steel plates, for example. In such an embodiment, the natural frequency of the pendulum containing the pendulous mass may be tuned by adjusting the distance between the center of mass of the modular mass and the point of rotation of the coupling element. The frequency of the pendulum may also be tuned by adjusting the distribution of mass within the cage so as to alter the moment of inertia of the moving mass about its own mass center, even if the total mass is unchanged.

Figure 3A:
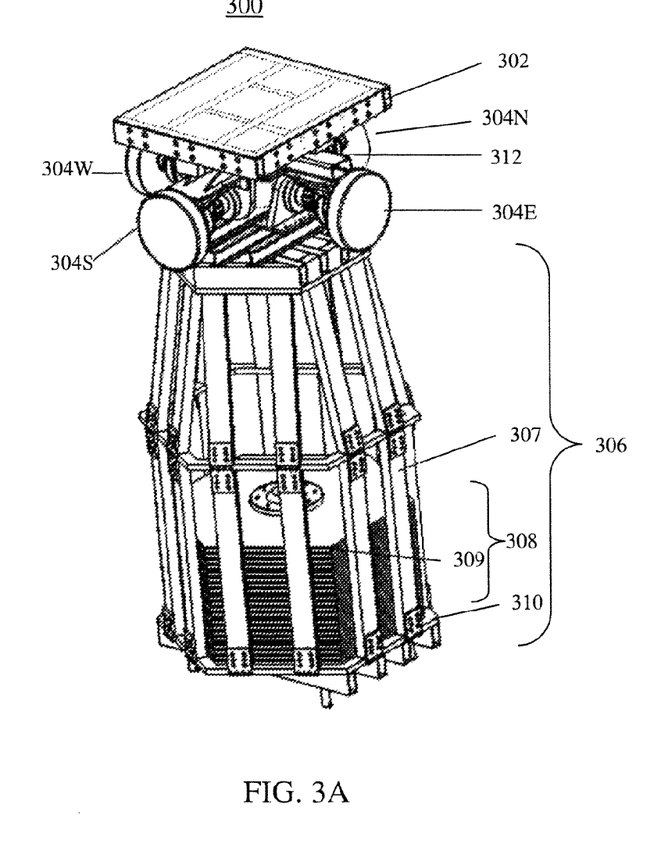
FIGS. 3A and 3B are perspective views of an embodiment of a pendulum tuned mass damper in accordance with the principles of claimed subject matter.
Figure 3B:
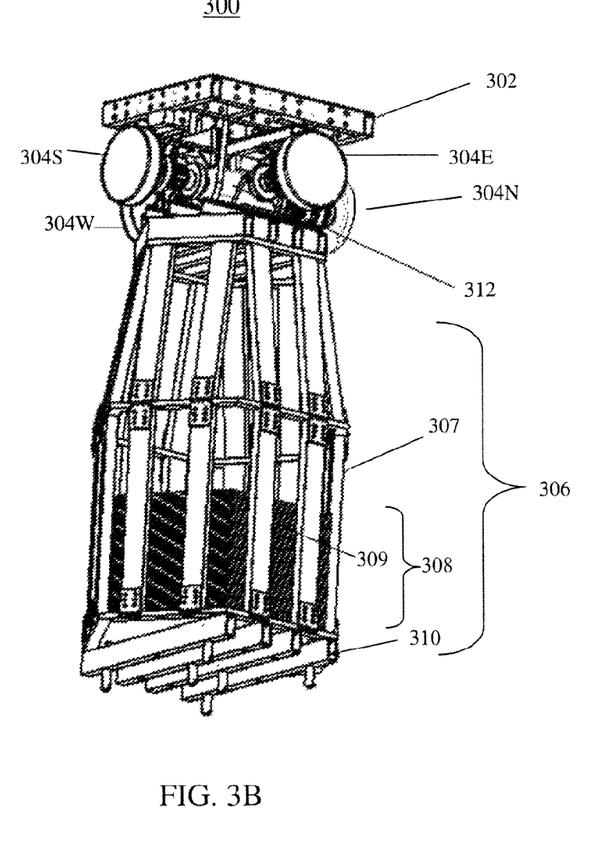

The perspective drawings of FIGS. 3A and 3B provide views of an illustrative embodiment of a tuned mass damper 300 in accordance with the principles of claimed subject matter. In FIGS. 3A and 3B an illustrative attachment element 302 is substantially composed of rigid steel beams formed into a box that is configured for insertion into and mating engagement with a support structure within a man-made structure that is to have its motion damped by the damper 300. In this illustrative embodiment the attachment element 302 includes openings for accepting rivets or bolts with which the tuned mass damper 300 may be connected to the man-made structure.

In the illustrative embodiment of FIGS. 3A and 3B four rotary magnetic dampers 304N, 304S, 304E, and 304W are configured. Rotary magnetic dampers 304N and 304S damp motions of the base structure in the east-west direction. Rotary magnetic dampers 304E and 304W damp motions in the north-south direction. Motions in other directions such as for example northeast to southwest, are damped by all four rotary magnetic dampers. As previously noted, compass directions are referred to for convenience of explanation only. A mass damper in accordance with the principles of claimed subject matter is not limited in its possible orientation.

The rotors of the rotary magnetic dampers 304N, 304S, 304E, and 304W are coupled to shafts that rotate with the mass element of the tuned mass damper relative to the base structure to which the damper 300 is attached. The coupling of the rotors to the cross shafts may be via elements such as gear boxes, for example, that amplify the rotary motion such that the relative angular velocity between the rotor and stator of the rotary magnetic damper is greater than the relative angular velocity between the base structure and the pendulous mass. In this illustrative embodiment a rigid cage 306 supports a modular mass 308. In this illustrative embodiment the cage 306 includes steel tubes or bars 307 that enclose a stack of steel plates 309 that form the modular mass 308. Plates 309 can be added to or subtracted from the modular mass 308 in order to obtain the desired moving mass for the damper 300. The natural pendulum frequency of the damper 300 may be tuned by adjusting the distance of the mass 308 from the bottom 310 of the cage. Such frequency adjustment may be achieved, for example, using hydraulic jacks to raise the mass 308 from the cage bottom 310, optionally shimming the mass in place once the proper center of mass location is achieved. Frequency adjustment may also be achieved by varying the moment of inertia of the entire moving mass, including the cage 306 and the plate stack 308, about its combined mass center. Raising the mass 308 within the cage will have both effects; it will change the effective pendulum length and will also change the moment of inertia of the entire moving mass 306 and 308 about its combined mass center.

As will be described in greater detail below, the stators of each of the magnetic rotary dampers are coupled (directly or indirectly) to the attachment element 302 to move in concert with the structure to which the tuned mass damper 300 is attached and the rotors of each of the magnetic rotary dampers are coupled, directly or indirectly, to the pendulous mass to rotate in concert with the pendulous mass (in this case, the mass 308 and cage 306). In this illustrative embodiment the coupling element 312 is a universal type of joint assembly described in greater detail in the discussion related to FIG. 4.

FIG. 3B, which provides a slightly upward perspective view, illustrates more clearly the connection between the coupling element 312 and the rotary magnetic dampers 304N, 304S, 304E, and 304W.

Figure 4:
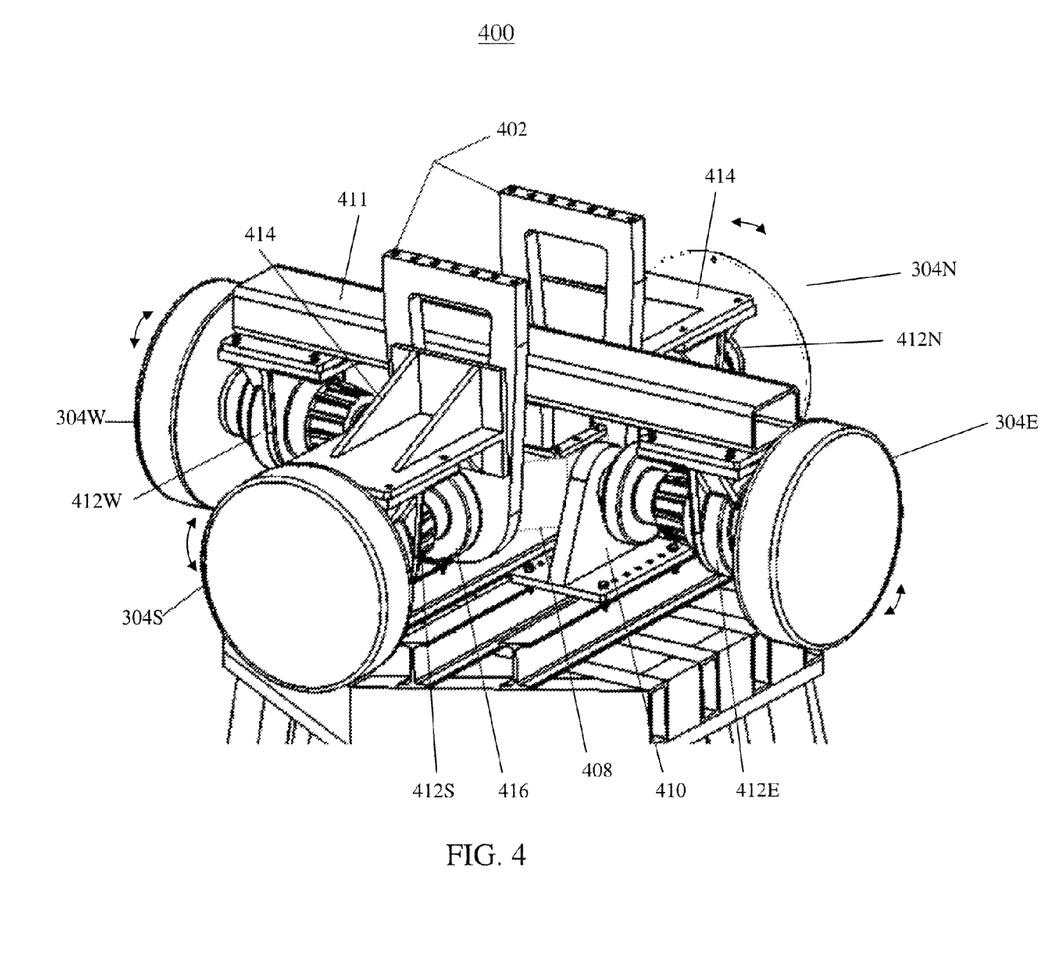
FIG. 4 is a perspective view of an embodiment of the coupling element shown in FIG. 3.

FIG. 4 provides a more detailed view of the coupling element 312. In this illustrative embodiment a universal joint is used to suspend a rigid structure, in this case cage 306, containing a modular mass 308. In such an illustrative embodiment, a universal joint may be used to allow the pendulous mass to swing in any vertical plane relative to a building as the building sways in various directions in response to environmental factors, such as wind, water waves, or earthquake. By allowing the pendulous mass to swing in any vertical plane, horizontal swaying motions in any direction of the building or other base structure can be damped. In such an embodiment and as described further below the universal joint includes a first hinge that couples the base structure to an intermediate element 408 herein called the spider block. The universal joint also includes a second hinge with axis oriented at ninety degrees to the first hinge axis. The second hinge connects the spider block 408 to the pendulous mass. Such a universal joint may also include a system of cross shafts which are parts of the first and second hinges.

Figure 5A:
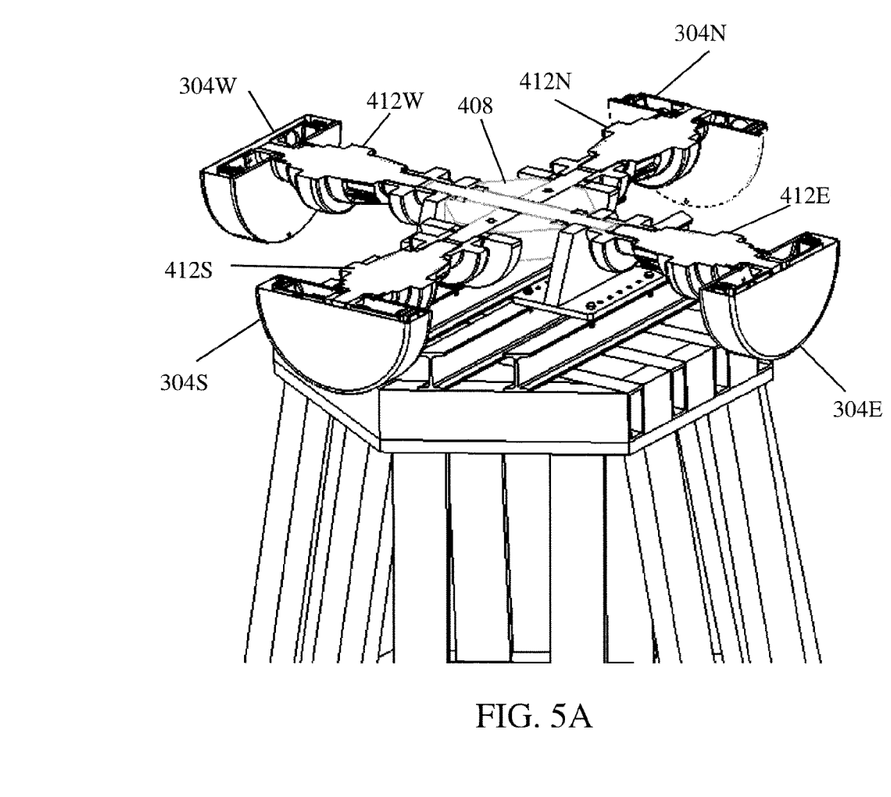
FIG. 5A is a horizontal sectional view of the coupling element shown in FIG. 4.
Figure 5B:
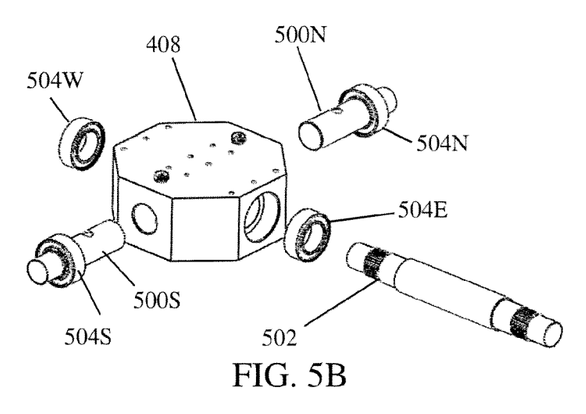
FIG. 5B is an exploded view of the spider block and shafts shown in FIG. 5A.
Figure 5C:
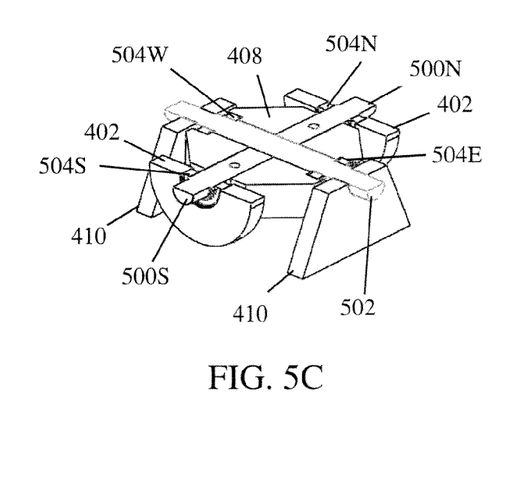
FIG. 5C is an enlarged horizontal sectional view of the spider block, shafts and plates shown in FIG. 5A FIGS. 6A, 6B, 6C and 6D are perspective views of the rotary magnetic damping element and velocity amplification device shown in FIG. 3.

With reference to FIGS. 4, 5A, 5B and 5C, in an illustrative embodiment, four rotary magnetic dampers 304E, 304W, 304N and 304S, each including a rotor and a stator, are coupled to the universal joint, with the rotor of each rotary magnetic damper coupled to one end of one of the shafts to rotate in cooperation with that shaft end. The rotors of magnetic dampers 304E and 304W are coupled to the ends of long cross shaft 502 which extends completely through the spider block 408. When the pendulous mass 306 swings in the north-south direction, the long cross shaft 502, which is oriented east-west, rotates with the pendulous mass and rotates relative to the spider block 408. The long cross shaft 502 rotates in rolling-element bearings 504E and 504W which are mounted in counterbored recesses on the east and west sides of the spider block 408. For a pure north-south swinging of the pendulous mass, the spider block 408 does not move. The rotors of magnetic dampers 304N and 304S each connect to the outboard end of one of the short cross shafts 500N and 500S. The two short cross shafts 500N and 500S are coaxial, are oriented north-south, are both rigidly pinned to the spider block 408, and each penetrate less than halfway through the spider block 408 as shown in FIG. 5C. The short cross shafts 500N and 500S rotate in rolling element bearings 504N and 504S, respectively, mounted in upper hanger plates 402. For a pure east-west swinging of the pendulous mass, the spider block 408 and the pendulous mass rotate together about the axis defined by the short cross shafts 500N and 500S.

In the illustrative embodiment of FIG. 4, upper hanger plates 402 contain rolling element bearings 504N and 504S that support short cross shafts 500N and 500S respectively. The short cross shafts 500N and 500S penetrate into and are fixed rigidly to the spider block 408, thus forming the upper, or first, hinge. Upper hanger plates 402 include threaded holes in their upper surface for attachment to suspension element 302.

Lower hanger plates 410 are rigidly fixed to the cage 306 of the pendulous mass. The spider block 408 mounts rolling element bearings 504E and 504W in counterbores in its east and west sides respectively. Long cross shaft 502 extends all the way through the spider block 408 and rotates on bearings 504E and 504W embedded in the spider block 408, thus forming the lower or second hinge. The lower or second hinge axis is perpendicular to the upper or first hinge axis. In an illustrative embodiment, the axis of the lower hinge may be displaced downward slightly relative to the axis of the upper hinge in order to make the natural swinging frequencies in the east-west and north-south directions equal, in spite of the fact that the rotational inertia for swinging in the east-west direction may be greater due to the contribution of the spider block, the rotary magnetic dampers 304W and 304E, and the gearboxes that drive those two dampers. The lower hanger plates 410 are splined to and thus rotate with the long cross shaft 502 as the pendulous mass 306 swings in the north-south direction. Lower hanger plates 410 are rigidly fastened to the cage 306 of the pendulous mass.

In this illustrative embodiment, the stators of the north 304N and south 304S rotary magnetic dampers are rigidly attached to the housings of the planetary gearboxes 412N and 412S respectively. The foot plates of the housings of the planetary gearboxes 412N and 412S are rigidly fixed to attachment brackets 414 which are rigidly fixed to the upper hanger plates 402. In this illustrative embodiment, swinging of the pendulous mass in the east-west direction causes rotation of the spider block 408 about the axis of the short cross shafts 500N and 500S which are oriented north-south. Rotation of the spider block 408 and rigidly attached short cross shafts 500N and 500S is translated through gearboxes 412N and 412S to the rotors of the north 304N and south 304S rotary magnetic dampers. Rotation of the rotors is indicated by the arrows in FIG. 4. In operation, planetary gearboxes 412N and 412S amplify the rotational motion of the pendulous mass and spider block 408 in order to produce greater eddy-current damping of the motion in the east/west direction of the structure to which the tuned mass damper is attached.

Similarly, the rotors of east and west rotary magnetic dampers 304E and 304W are coupled through planetary gearboxes 412E and 412W to the east and west ends of the long cross shaft 502. Swinging of the pendulous mass in the north-south direction causes rotation of the long cross shaft 502 in bearings embedded in the spider block 408. In this illustrative embodiment the stators of east and west rotary magnetic dampers 304E, 304W are fixed to and supported by the housings of east 412E and west 412W planetary gearboxes which are in turn mounted rigidly to torque tube 411. The torque tube 411 is fixed rigidly to the spider block 408. In this illustrative embodiment, stators of the rotary magnetic damper 304E, 304W move with the spider block 408 in response to east/west swinging of the pendulous mass 306. The rotors of the rotary magnetic dampers 304E, 304W rotate, as indicated, with any north/south swinging motion of the pendulous mass 306 relative to the base structure. Planetary gearboxes 412E and 412W amplify the rotational velocity of the rotors of the rotary magnetic dampers 304E and 304W respectively in order to increase their eddy current damping.

FIG. 5 provides a sectional view of an illustrative universal joint embodiment of coupling element 312. In this illustrative embodiment, shafts coupled to the universal joint may be coupled to rotary magnetic mass dampers through gearboxes. The gearboxes cause the relative angular velocity between the rotor and stator of the rotary magnetic dampers to be greater than the relative angular velocity between the TMD mounting element 302 and the pendulous mass, thus increasing the effective damping. The coupling element 312 includes spider block 408, gearboxes 412N, 412S, 412E, and 412W, rotary magnetic dampers 304N, 304S, 304E, 304W, four identical shaft couplers 416, the first or upper hinge between hanger plates 402 and the spider block 408, and the second or lower hinge between the spider block 408 and lower hanger plates 410.

In this illustrative embodiment, north and south rotary magnetic dampers 304N, 304S are driven by short cross-shafts 500N and 500S which are rigidly pinned or bolted to the spider block 408, which, as previously described, rotates in response to relative structural movement in an east/west direction while suspended from hanger plates 402. Rolling element bearings in the upper hanger plates 402 support the short cross shafts 500N and 500S. East and west rotary magnetic dampers 304E, 304W in this illustrative embodiment are driven through gearboxes 412E and 412W by the long cross shaft 502 which is splined to lower hanger plates 410. The long cross shaft 502 is supported by rolling element bearings 504E and 504W in the spider block 408. As previously described, east and west rotary magnetic dampers 304E, 304W are driven by rotational motion of the pendulous mass 306 relative to the spider block 408.

Figure 6A:
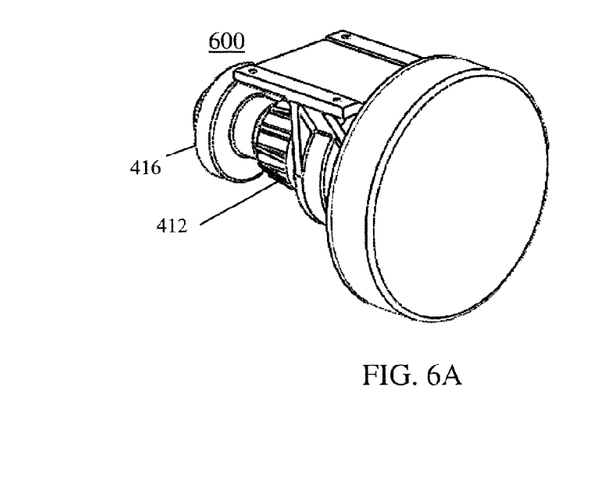
Figure 6B:
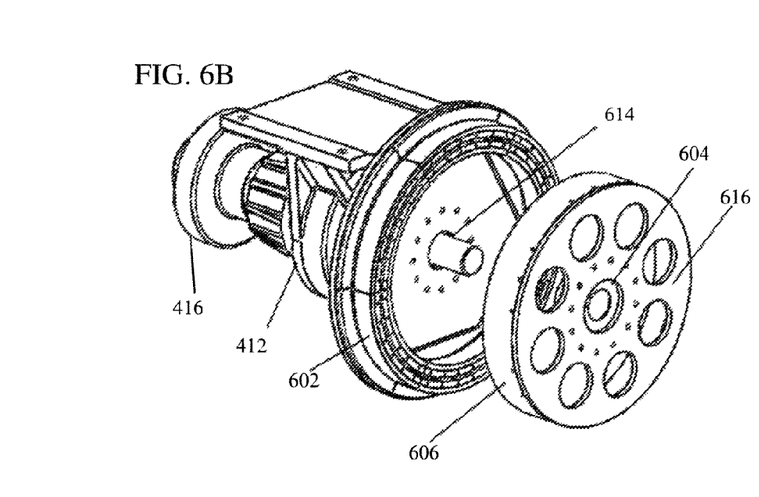
Figure 6C:
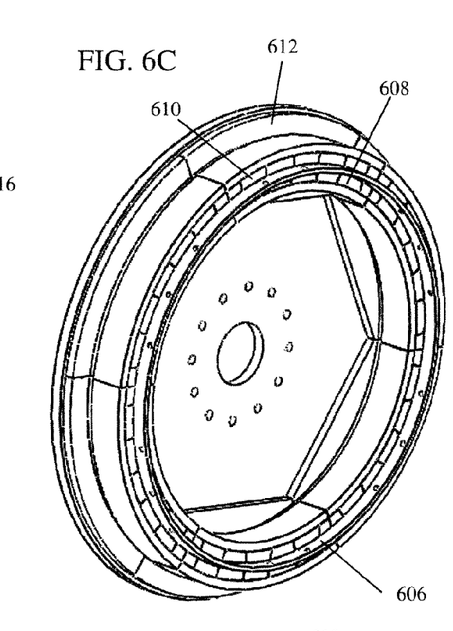

FIGS. 6A through 6D provide more detailed views of a rotary magnetic damper 600. FIG. 6A depicts one of four identical assemblies consisting of a rotary damper 600, a motion-amplifying planetary gearbox 412, and a shaft coupler 416. FIG. 6C depicts the stator of such a damper 600 with a portion of its housing removed. In this illustrative embodiment, two concentric rings of permanent magnets 608 and 610 form the stator of the damper 600. Each ring is composed of alternating annular segments of permanent magnet material and nonmagnetic material such as aluminum. The magnet segments are polarized in the radial direction with the poling direction alternating between radially inward and radially outward, progressing around the ring. Both the inner magnet ring 608 and outer magnet ring 610 are fixed to a baseplate 612 that is fixed to the housing flange of a planetary gearbox 412 that drives the rotor of the rotary damper. A radial gap is formed between the inner and outer magnet rings. An annular conductor ring 606 is positioned in the gap. The rotor of the damper is composed of an annular conductor ring 606 of a highly conductive material such as copper, a central shaft 614 coaxial with the conductor ring 606, and an interface element for connecting the conductor ring 606 and the shaft 614. The interface element is composed of a flange 604 keyed or splined to the shaft 614 and a round plate 616 that is fixed to the flange 604 and to the conductor ring 606.

Figure 6D:
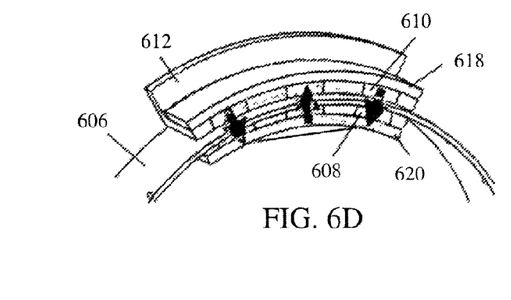

FIG. 6D shows circumferential segments of the inner and outer magnet rings 608 and 610. Also shown is a portion of the conductor ring 606. The magnetization directions, indicated by thick dark arrows in FIG. 6D, alternate between radially inward and radially outward, progressing around the ring. An outer back iron ring 618 is located outside the outer ring of magnets and an inner back iron ring 620 is located inside the inner ring of magnets. Each successive pair of magnets in either the outer or inner magnet ring, combined with the portion of the back iron ring between them, forms a horseshoe magnet. Each pair of two such horseshoes, one inside and one outside the conductor ring with opposing poles facing each other, results in a loop of magnetic flux. The flux loop penetrates the conductor ring over two areas ("patches") each located between an inner and outer magnet segment. As the conductor rotates relative to the magnetic field, an axial electric field is induced in the conductor within each flux patch. Proceeding around the rings, the electric fields point in alternating axial directions and result in eddy current loops flowing in the conductor ring. The interaction of the current flowing axially within the flux patches and the radial flux field within the patches produces a tangential drag force that opposes the tangential velocity of the conductor ring and is proportional to it, providing a rotary magnetic dashpot.

In this illustrative embodiment, the annular conductor ring 606 fits in the radial gap between the inner and outer magnet rings 608 and 610. In operation, rotation of the shaft 614 produces relative motion in a tangential direction between the fixed field from the permanent magnets 608 and 610 and the conductor ring 606. This induces eddy current loops within the annular conductor 606. As is known in the art, with greater relative tangential velocity of the conductor relative to a static magnetic field, the established eddy currents effect greater opposition to movement of the conductor. Step-up gearing within the gear box 416 amplifies the rotational velocity of the annular conductor 606, thereby amplifying the damping torque of the rotary damper 600.

Figure 7:
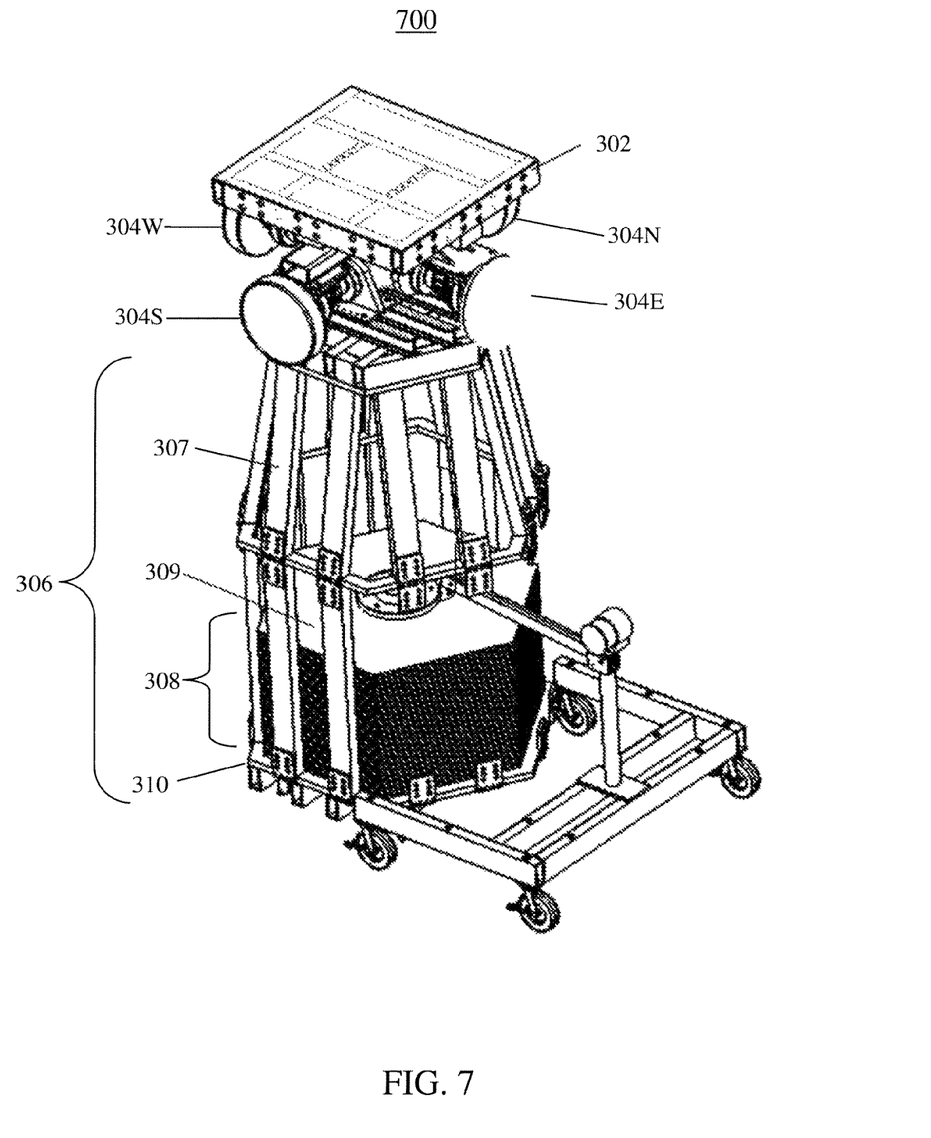
FIG. 7 is a perspective view illustrating the adjustment of the mass of the pendulum tuned mass damper shown in FIG. 3.

The perspective view of FIG. 7 illustrates a process whereby the mass of a pendulous mass may be adjusted. In this illustrative embodiment, portions of the steel bars forming the cage 307 have been removed in order to add or remove steel plates 309 that form the bulk of the pendulous mass. As previously described, the distance from the pendulous mass' center-of-mass to the support element 302 may be adjusted by adjusting the distance between the cage bottom 310 and modular mass 308.

Figure 8:
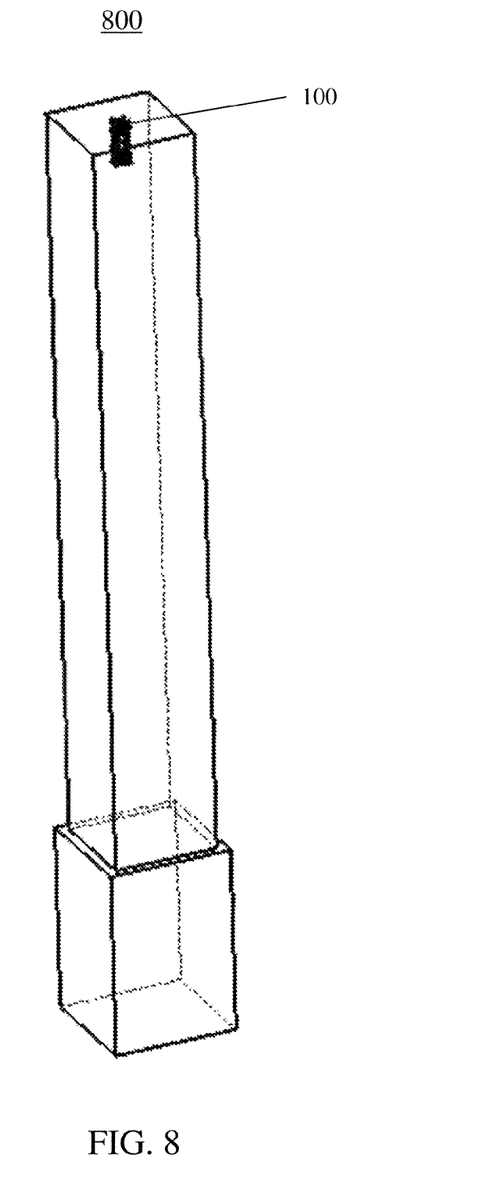
FIG. 8 is a perspective view of a tower structure including a pendulum tuned mass damper in accordance with the principles of claimed subject matter.

The perspective view of FIG. 8 illustrates a steel tower structure 800 that includes a tuned mass damper 100. The structure 800 in this illustrative embodiment is a tower that contains mechanical systems which could be jeopardized with swaying of the tower due to wind. The fatigue life of the tower would be adversely affected by wind-induced motions were it not for the damping action of the TMD. In this illustrative embodiment, the pendulous mass of the TMD is approximately 2% of the modal mass of the target mode when the shape of that mode is normalized to unit displacement at the mounting location of the TMD.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments. While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A damper for a structure, comprising:
a pendulous mass configured for coupling to a base structure;
a rotary magnetic damper having a fixed element and rotating element mechanically coupled to the pendulous mass such that relative motion between the pendulous mass and the base structure to which the pendulous mass is coupled imparts rotation of the rotating element of the rotary magnetic damper relative to the fixed element of the rotary magnetic damper to thereby damp the relative motion between the pendulous mass and the base structure to which the pendulous mass is coupled and thereby to damp the motion of the base structure;

a coupling element for coupling the pendulous mass to the structure, the coupling element including a first hinge for rigid engagement with the structure, a second hinge oriented at ninety degrees to the first hinge, the second hinge for rigid engagement with the pendulous mass, and a cross shaft connecting the first and second hinges, the cross shaft including four shaft ends; and the damper including four rotary magnetic dampers, each rotary magnetic damper including a rotor and a stator, the rotor of each of the rotary magnetic dampers being coupled to a different one of the four shaft ends to move in cooperation with the shaft ends, the stators of two of the rotary magnetic dampers coupled to the first hinge to thereby allow relative rotation between the corresponding rotary magnetic damper rotors and stators in response to relative movement between the structure and the cross shaft around a first axis, the stators of the other two of the rotary magnetic dampers coupled to the second hinge to thereby allow relative rotation between the corresponding rotary magnetic damper rotors and stators in response to relative movement between the cross shaft and the pendulous mass around a second axis.

2. The damper of claim 1, wherein the pendulous mass includes a rigid carrier and a modular mass supported by the rigid carrier.

3. The damper of claim 1, wherein the pendulous mass may be characterized by a natural frequency and the pendulous mass is configured for adjustment of its natural frequency.

4. The damper of claim 1, further comprising:
a motion amplifier configured to cause a damping element to experience greater angular motion between its fixed and moving elements than occurs between the pendulous mass and the base structure.

5. The damper of claim 4, wherein the motion amplifier comprises a planetary gearbox.

6. The damper of claim 1, wherein the rotating element of the rotary magnetic damper includes a rotor fitted with an annular conductor.

7. The damper of claim 1, wherein the pendulous mass includes a rigid cage carrying a modular mass.

8. The damper of claim 7, wherein the modular mass includes a steel plate.

9. An apparatus, comprising:
a man-made structure; and
a damper, including:
a pendulous mass including a modular mass supported by a rigid carrier, a coupling element for coupling the pendulous mass to the structure, the coupling element including: a first hinge for rigid engagement with the structure, a second hinge oriented at ninety degrees to the first hinge, the second hinge for rigid engagement with the pendulous mass, an intermediate element connecting the first and second hinges, the intermediate element including four shaft ends, and
the damper including four rotary magnetic dampers, each rotary magnetic damper including a rotor and a stator, the rotor of each of the rotary magnetic dampers being coupled to a different one of the four shaft ends to move in cooperation with the shaft ends, the stators of two of the rotary magnetic dampers coupled to the first hinge to thereby allow relative rotation between the corresponding rotary magnetic damper rotors and stators in response to relative movement between the structure and the intermediate element around a first axis, the stators of the other two of the rotary magnetic dampers coupled to the second hinge to thereby allow relative rotation between the corresponding rotary magnetic damper rotors and stators in response to relative movement between the intermediate element and the pendulous mass around a second axis, the coupling between shaft ends and rotary magnetic dampers including planetary gear boxes which increase the rotational velocity of the rotary magnetic damper rotors compared to the rotational velocity of the shaft ends.

10. A method comprising:
coupling a pendulous mass to a structure through a coupling element including a first hinge for rigid engagement with the structure and a second hinge oriented at ninety degrees to the first hinge, the second hinge for rigid engagement with the pendulous mass, an intermediate element connecting the first and second hinges, the intermediate element including four shaft ends;
mechanically coupling the pendulous mass to a rotating element of a rotary magnetic damper such that relative motion between the pendulous mass and the base structure to which the pendulous mass is coupled imparts rotation of the rotating element of the rotary magnetic damper relative to a fixed element of the rotary magnetic damper to thereby damp the relative motion between the pendulous mass and the structure and thereby damp the absolute motion of the structure; and
coupling the rotor of each of four rotary magnetic dampers to a different one of the four shaft ends to move in cooperation with the shaft ends, coupling the stators of two of the rotary magnetic dampers to the first hinge to thereby allow relative rotation between the corresponding rotary magnetic damper rotors and stators in response to relative movement between the structure and the intermediate element around a first axis, coupling the stators of the other two of the rotary magnetic dampers to the second hinge to thereby allow relative rotation between the corresponding rotary magnetic damper rotors and stators in response to relative movement between the intermediate element and the pendulous mass around a second axis.

11. The method of claim 10, wherein the step of coupling a pendulous mass to the structure includes the step of coupling a modular mass supported by a rigid carrier.

12. The method of claim 10, further comprising:
suspending the pendulous mass from a support element and adjusting the distance of the pendulous mass' center of mass from the support element.

13. The method of claim 10, further comprising:
causing the rotary magnetic damper to experience greater annular motion between its fixed and moving elements than occurs between the pendulous mass and the base structure.

14. The method of claim 13, wherein the step of amplifying the motion comprises employing a planetary gearbox to multiply the angular velocity of the relative motion between the structure and the pendulous mass.

15. The method of claim 10, wherein the step of coupling a rotary magnetic damper includes coupling a rotary magnetic damper fitted with an annular conductor.

16. The method of claim 10, wherein the step of coupling a pendulous mass includes the step of coupling a rigid cage enclosing a modular mass.

17. The method of claim 16, wherein the step of coupling a pendulous mass includes coupling a modular mass that comprises a steel plate.

18. A method comprising:
coupling a pendulous mass including a modular mass supported by a rigid carrier, through a coupling element, to a structure, the coupling element including a first hinge for rigidly engaged with the structure, a second hinge oriented at ninety degrees to the first hinge and rigidly engaged with the pendulous mass, an intermediate element connecting the first and second hinges, the intermediate element including four shaft ends, mechanically coupling the pendulous mass to a rotating element of a rotary magnetic damper such that relative motion between the pendulous mass and the base structure to which the pendulous mass is coupled imparts rotation of the rotating element of the rotary magnetic damper relative to a fixed element of the rotary magnetic damper to thereby damp the relative motion between the pendulous mass and the structure and thereby damp the absolute motion of the structure, and coupling the rotor of each of four rotary magnetic dampers which include a rotor and a stator, to a different one of the four shaft ends to move in cooperation with the shaft ends, coupling the stators of two of the rotary magnetic dampers to the first hinge to thereby allow relative rotation between the corresponding rotary magnetic damper rotors and stators in response to relative movement between the structure and the intermediate element around a first axis, coupling the stators of the other two of the rotary magnetic dampers to the second hinge to thereby allow relative rotation between the corresponding rotary magnetic damper rotors and stators in response to relative movement between the intermediate element and the pendulous mass around a second axis, wherein the coupling of shaft ends and rotary magnetic dampers includes the step of coupling between shaft ends and rotary magnetic dampers using planetary gear boxes and shaft couplers which increase the rotational velocity of the rotary magnetic damper rotors compared to the rotational velocity of the shaft ends.

\* \* \* \* \*